(12) United States Patent
Skiba et al.

(10) Patent No.: US 10,599,765 B2
(45) Date of Patent: Mar. 24, 2020

(54) SEMANTIC TRANSLATION MODEL TRAINING

(71) Applicant: Avaya Inc., Basking Ridge, NJ (US)

(72) Inventors: David Skiba, Golden, CO (US); George Erhart, Loveland, CO (US); Lee Becker, Boulder, CO (US); Valentine C. Matula, Granville, OH (US)

(73) Assignee: Avaya Inc., Basking Ridge, NJ (US)

( * ) Notice: Subject to any disclaimer, the term of this patent is extended or adjusted under 35 U.S.C. 154(b) by 1742 days.

(21) Appl. No.: 13/929,090

(22) Filed: Jun. 27, 2013

(65) Prior Publication Data

US 2015/0006143 A1    Jan. 1, 2015

(51) Int. Cl.
*G06F 17/27* (2006.01)
*G06F 17/28* (2006.01)

(52) U.S. Cl.
CPC .......... *G06F 17/271* (2013.01); *G06F 17/275* (2013.01); *G06F 17/2785* (2013.01); *G06F 17/289* (2013.01)

(58) Field of Classification Search
CPC .......................... G06F 17/289; G06F 17/30979
USPC ...................................... 704/277, 2, 8, 9, 10
See application file for complete search history.

(56) References Cited

U.S. PATENT DOCUMENTS

| | | | | |
|---|---|---|---|---|
| 8,412,514 B1* | 4/2013 | Feng | .................. | G06F 17/2211 704/1 |
| 2002/0023144 A1* | 2/2002 | Linyard | ................ | G06F 9/4446 709/218 |
| 2005/0105712 A1* | 5/2005 | Williams | .............. | G10L 13/027 379/265.02 |
| 2006/0078862 A1* | 4/2006 | Goto | ........................ | G09B 7/02 434/322 |
| 2007/0118519 A1* | 5/2007 | Yamasawa | ........ | G06F 17/30976 |
| 2008/0195378 A1* | 8/2008 | Nakazawa | ........ | G06F 17/30654 704/9 |
| 2009/0186330 A1* | 7/2009 | Brownholtz | ........... | G06Q 10/10 434/362 |
| 2010/0076998 A1* | 3/2010 | Podgorny | .............. | G06Q 10/10 707/772 |
| 2011/0125734 A1* | 5/2011 | Duboue | ................... | G09B 7/00 707/723 |
| 2011/0153312 A1* | 6/2011 | Roberts | ............. | G06F 17/30654 704/9 |
| 2013/0073276 A1* | 3/2013 | Sarikaya | ............... | G06F 17/289 704/2 |

FOREIGN PATENT DOCUMENTS

EP     1657651     5/2006

* cited by examiner

*Primary Examiner* — Jakieda R Jackson
(74) *Attorney, Agent, or Firm* — Sheridan Ross P.C.

(57) ABSTRACT

A semantic translation model system is described along with various methods and mechanisms for administering the same. The semantic translation model system proposed herein creates an intermediate representation and a knowledge base in multiple languages, reducing the amount of time and expensive resources typically required for translation and automatic response to written communications. The system also removes the problem of a translation being influenced by a person's writing style and human misinterpretation and provides ongoing translation to keep the system current.

20 Claims, 6 Drawing Sheets

SEMANTIC TRANSLATION MODEL TRAINING

FIELD OF THE DISCLOSURE

The present disclosure is generally directed toward communications and more specifically toward contact centers.

BACKGROUND

Automated systems and analysis procedures for text-based interactions (email, chat, and social media) rely on text models of language with domain-specific information. Configuration, training, and translation can be expensive and time-consuming processes that require experts in the language and the domain. It is often difficult to justify the large financial and time costs associated with employing several people to create translations in multiple languages. There is also a lack of consistency in translation methodology and cultural adaptation.

Automatic machine translation of language can be problematic as simple substitution of words in one language for words in another does not typically produce a good translation. Within limited domains, machine translation may be effective, but machine translation in an interactive environment is ineffective and leads to customer dissatisfaction.

The complexity and expense of domain-specific translation in an interactive environment encourages the development of a new approach to address these issues. Additionally, the new approach needs to be a living model, one that is not static and does not require expensive periodic intervention by translators to remain current.

SUMMARY

These and other needs are addressed by the various aspects, embodiments, and/or configurations of the present disclosure. The present disclosure is directed to a semantic translation model system which is operable to build a structure able to handle multiple languages to answer questions in an interactive domain like, but not limited to, an automated chat session, a contact center environment, and/or one or more HTML documents.

Semantics is the study of meaning that focuses on the relationship between signifiers (e.g., words, phrases, signs, and symbols) and their meaning. Linguistic semantics is the study of meaning that is used for understanding human expression through language. In linguistics, semantics is the study of interpretation of signifiers used in particular circumstances and contexts. For example, in written language, paragraph structure and punctuation bear identifiable semantic content. Each language has identifiable semantic content. Many languages share roots of words, allowing some comprehension by speakers of other languages in many instances. The vocabulary, grammar, and other characteristics can be identified through semantic content analysis. Two key components include an ability to analyze a core meaning of the language segment and identify a sentence or segment to ask a question about (identify subject, verb, object, etc.).

Subjects, verbs, and objects tend to be considered syntactically. Shallow semantics consider words like agent, patient, and theme, or more specific roles like sender and receiver. Syntactic labels essentially serve as shorthand for knowing who was doing what to whom. With subject/objects, there may be a structural aspect of the subject/object with relation to the verb, but there may be no inferential meaning as in the following example:

[John agent] [gave predicate] [the ball theme] to [Mary receiver]

[Dave agent] [drove predicate] [the car] through [the tunnel path]

The semantic translation model system builds a structure operable to answer questions in an automated chat session. The semantic translation model system can create the structure based on a large amount of known question and answer pairs, key word translation, semantic analysis, syntactic analysis, and language rules and structure. The semantic translation model system can automatically generate language training materials in additional languages based on a configured source language, reducing the requirements of specific language skills and domain knowledge in multiple languages.

The semantic translation model system analyzes the text training materials for one language at a semantic and topic/domain level. The knowledge base in multiple languages can be created based on curated question/answer pairs. The knowledge base assists with the training because the semantic translation model system can start from a base language and then move to a new language. The semantic translation model system creates an intermediate representation of the knowledge one needs to map dialogs from one language to another. The semantic level is then automatically translated to the target language based on language rules and word usage. The semantic translation model system takes into account the normal speech patterns of the target languages. The semantic translation model system includes a process flow, segment patterning, syntactic topic patterning, and keyword translation. The semantic translation model system does a topic/noun translation and then creates a new sentence within the appropriate language based on knowledge of language's structure. The words are worked into the proper combinations using the semantics of the target language to automatically generate the training materials for the target language.

For example, a text processing and automatic answer generation system is created for a bank customer in English for use in chat and social media sessions. The system is able to analyze incoming questions about loans, balances, accounts, and other basic banking information. The goal is to take the configured system in English, and upon request by a customer, use the invention to create a functional system in Turkish.

The semantic translation model system will take the data collected from the English system and perform the segmentation, semantic, and syntactic analysis for English banking type interactions (i.e. semantic structure on how people ask for their payment history). The English text can be translated at a semantic/structural level into the target language, Turkish. The process is repeated for all forms of interactions, including questions and matching automated answers. In addition, topic or domain words, phrases, and constructs are identified as the second set of information to be translated (i.e. loan balance, interest rate, rate, payment history, etc.).

With the two key components in place, the system will automatically combine the components using the translated parts and the target language (Turkish) linguistic rules. The result is a Turkish model for questions and answers. The system can accept Turkish inquiries about the same topics supported in the English model. The Turkish version will be functional based on actual Turkish ways of speaking, on linguistic rules for the Turkish language, and on signifiers specific to the banking domain.

Generally, there will be proper names of products, companies and technologies that will not be translated between languages. The system will provide proper name protection from translation by identifying these elements in the source text and preserving them in the translated version. For example, "Avaya" would not be translated between languages as it is a language independent symbol.

In additional embodiments, the semantic translation model training system can be used in a contact center environment, though not limited as such. Additionally, the semantic translation model training system may be used in many areas of business, including, but not limited to, banking, healthcare, emergency response, and other types of customer service venues.

These and other advantages will be apparent from the disclosure.

The term "automatic" and variations thereof, as used herein, refers to any process or operation done without material human input when the process or operation is performed. However, a process or operation can be automatic, even though performance of the process or operation uses material or immaterial human input, if input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The term "customer" or "client" denotes a party patronizing, serviced by, or otherwise doing business with a contact center, business, or enterprise.

A "database" as used herein refers to an organized set of data held in a computer. The organization schema or model for the data can, for example, be hierarchical, network, relational, entity-relationship, object, document, XML, entity-attribute-value model, star schema, object-relational, associative, multidimensional, multi-value, semantic, and other database designs.

The terms "determine," "calculate," and "compute," and variations thereof as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Figure 1:
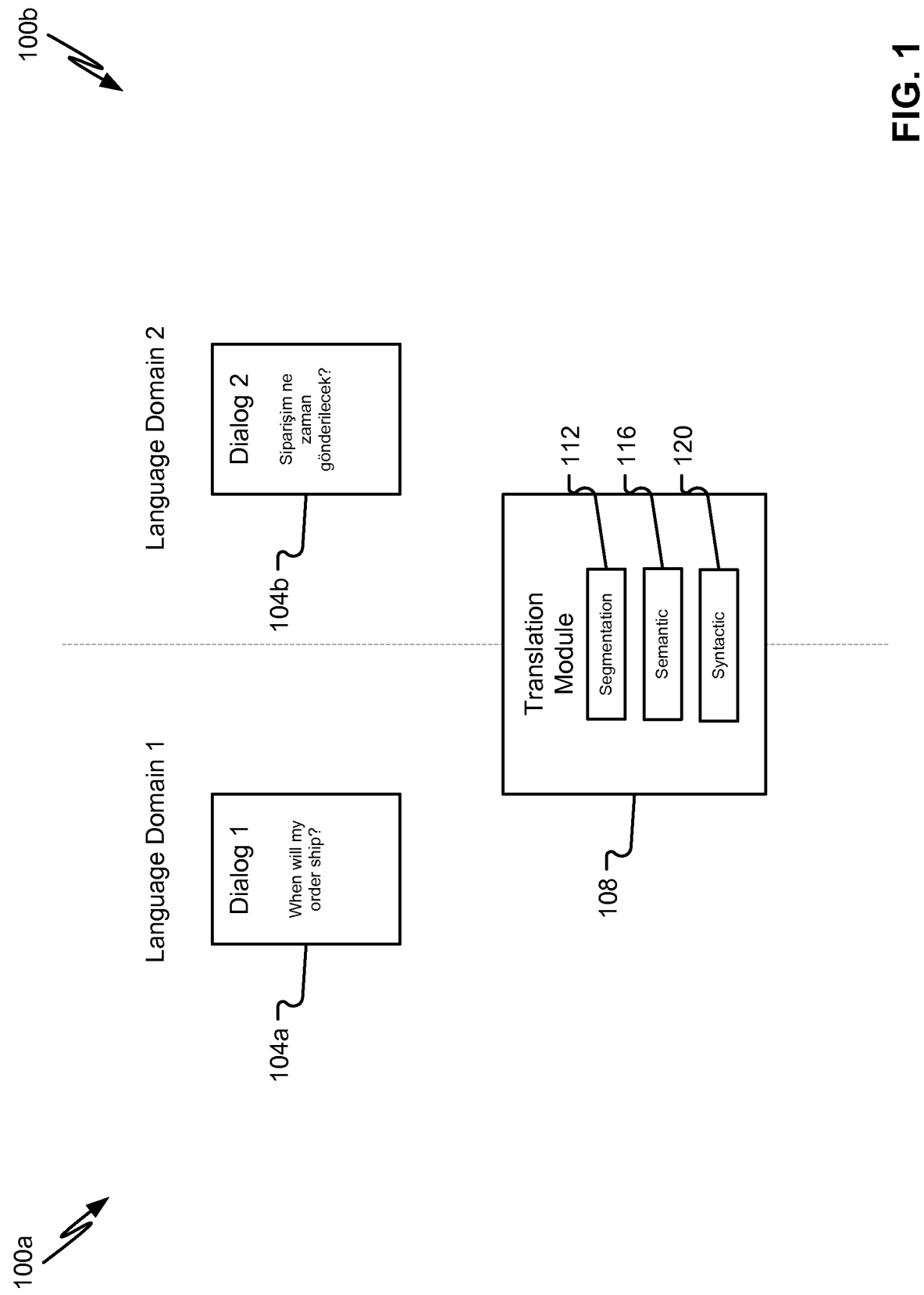
FIG. 1 is an example of a semantic translation model training system in accordance with embodiments of the present disclosure.

FIG. 1 shows an illustrative embodiment of a semantic translation model training system in accordance with at least some embodiments of the present disclosure. A semantic translation model training system language domain 1 100*a* and a language domain 2 100*b* may be connected by a module 108. Language domain 1 100*a* and language domain 2 100*b* are areas that may contain and have the ability to store customized sets of keywords, phrases, questions, and answers in a particular language. A semantic translation model training system may be operable to translate keywords and phrases in a first language domain (e.g., English) to keywords and phrases in a second language domain (e.g., Turkish). The language domain 1 100*a* and the language domain 2 100*b* contain keywords, phrases, for segmentation, semantic, and syntactic analysis.

A translation module 108 may sit on a boundary between language domain 1 100*a* and language domain 2 100*b*. The translation module 108 can facilitate translation capabilities between the two language domains 100*a*, 100*b*. The translation module 108 is operable to receive a dialog 104, recognize a first language question and determine if an answer exists. Additionally, the translation module 108 can automatically create a translation of a question and answer pair in a second language based on analysis and system training.

More particularly, the translation module 108 can include a segmentation application 112, a semantic application 116, and a syntactic application 120. The translation module 108 can further create new dialogs 104 (e.g., "Sipariş im ne zaman gönderilecek?" 104*b*) in language domain 2 100*b* based on questions and/or answers in the language domain 1 100*a* (e.g., "When will my order ship?" 104*a*). In addition to detecting a question and/or answer to a first language question, the translation module 108 can combine components to create question and answer components in the second language in language domain 2 100*b*.

The translation module 108 uses the segmentation application 112, the semantic analyzer 116, and the syntactic analyzer 120 to create a model in language domain 2 100*b*. Dialog 2 104*b* contains the question based on the translation of the question in dialog 1 104*a*, reconstructed in a new language model. Although the semantic translation model training system may be described in some embodiments for use in a contact center, it is not necessarily so limited. The semantic translation model training system may be used in any type or form of business for automatic modeling and translation services.

Figure 2:
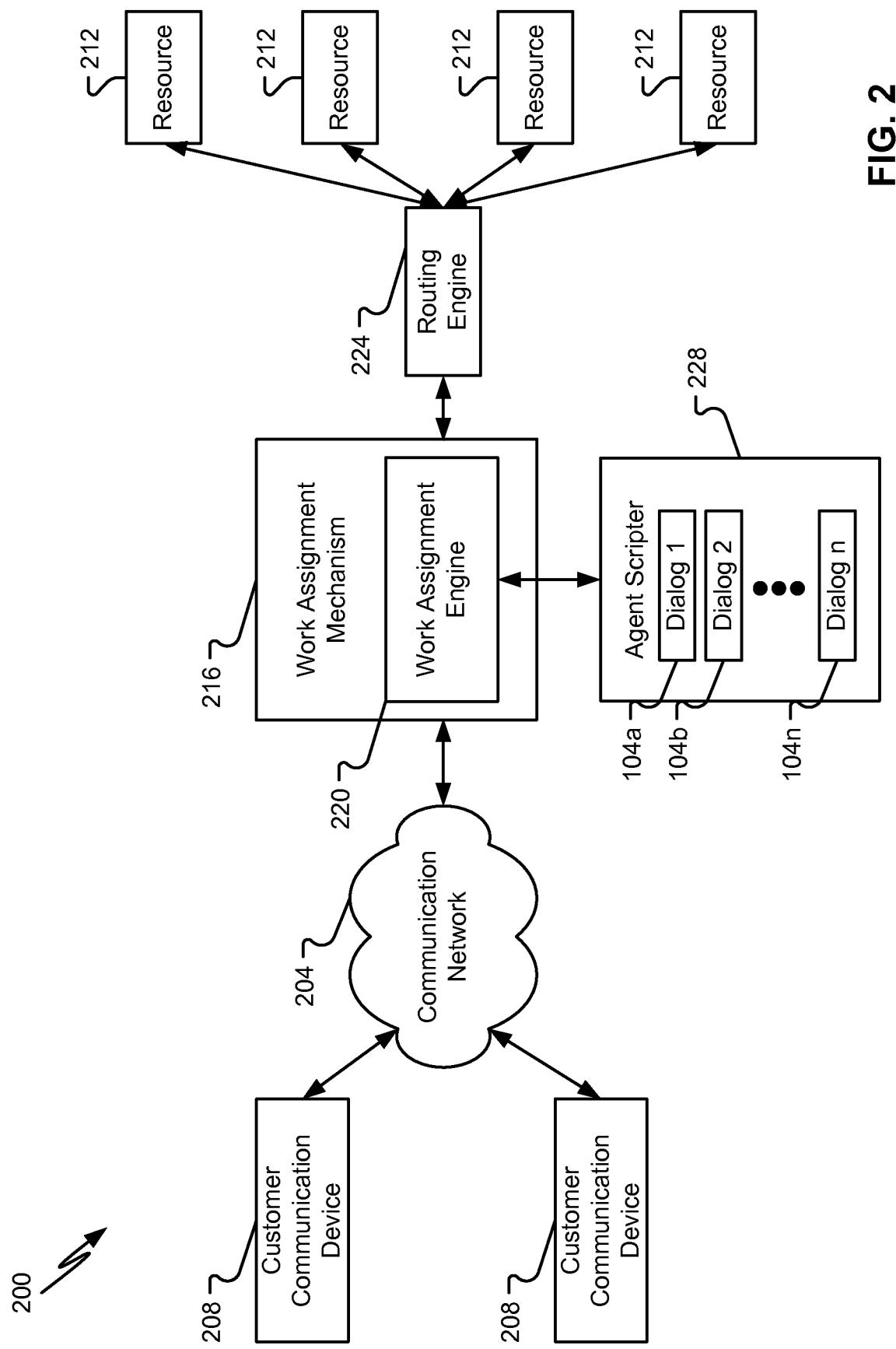
FIG. 2 is a block diagram of a communication system in accordance with embodiments of the present disclosure.

FIG. 2 shows an illustrative embodiment of a communication system 200 in accordance with at least some embodiments of the present disclosure. The communication system 200 may be a distributed system and, in some embodiments, comprises a communication network 204 connecting one or more customer communication devices 208 to a work assignment mechanism 216, which may be owned and operated by an enterprise administering a contact center in which a plurality of resources 212 are distributed to handle incoming work items from the customer communication devices 208.

In accordance with at least some embodiments of the present disclosure, the communication network 204 may comprise any type of known communication medium or collection of communication media and may use any type of protocols to transport messages between endpoints. The communication network 204 may include wired and/or wireless communication technologies. The Internet is an example of the communication network 204 that constitutes and Internet Protocol (IP) network consisting of many computers, computing networks, and other communication devices located all over the world, which are connected through many telephone systems and other means. Other examples of the communication network 204 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 204 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 204 may comprise a number of different communication media such as coaxial cable, copper cable/wire, fiber-optic cable, antennas for transmitting/receiving wireless messages, and combinations thereof.

The communication devices 208 may correspond to customer communication devices. In accordance with at least some embodiments of the present disclosure, a customer may utilize their communication device 208 to initiate a work item, which is generally a request for a processing resource 212. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 204. For example, the work item may be transmitted as a telephone call, a packet or collection of packets (e.g., IP packets transmitted over an IP network), an email message, an Instant Message, an SMS message, a fax, and combinations thereof.

The work assignment mechanism 216 may employ any queue-based or queueless work assignment algorithm. Examples of queue-based work assignment skill-based algorithms include, without limitation, a fairness algorithm, pacing algorithm (which inserts rests into the agents work queue), value-based algorithms, limited algorithms (such as Business Advocate™ by Avaya, Inc.), and outsourcing algorithms. Other algorithms may consider other types of data inputs and/or may treat certain data inputs differently.

The format of the work item may depend upon the capabilities of the communication device 208 and the format of the communication. In particular, work items are logical representations within a contact center of work to be performed in connection with servicing a communication received at the contact center (and more specifically the work assignment mechanism 216). The communication may be received and maintained at the work assignment mechanism 216, a switch or server connected to the work assignment mechanism 216, or the like until a resource 212 is assigned to the work item representing that communication at which point the work assignment mechanism 216 passes the work item to a routing engine 224 to connect the communication device 208 to the assigned resource 212.

Although the routing engine 224 is depicted as being separate from the work assignment mechanism 216, the routing engine 224 may be incorporated into the work assignment mechanism 216 or its functionality may be executed by the work assignment engine 220.

In accordance with at least some embodiments of the present disclosure, the communication devices 208 may comprise any type of known communication equipment or collection of communication equipment. Examples of a suitable communication device 208 include, but are not limited to, a personal computer, laptop, tablet, cellular phone, smartphone, telephone, or combinations thereof. In general, each communication device 208 may be adapted to support video, audio, text, and/or data communications with other communication devices 208 as well as the processing resources 212. The type of medium used by the communication device 208 to communicate with other communication devices 208 or processing resources 212 may depend upon the communication applications available on the communication device 208.

In accordance with at least some embodiments of the present disclosure, the work item can be sent toward a collection of processing resources 212 via the combined efforts of the work assignment mechanism 216 and routing engine 224. The resources 212 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 216 and resources 212 may be owned and operated by a common entity in a contact center format. In some embodiments, the work assignment mechanism 216 may be administered by multiple enterprises, each of which has their own dedicated resources 212a-n connected to the work assignment mechanism 216.

In some embodiments, the work assignment mechanism 216 comprises a work assignment engine 220 which enables the work assignment mechanism 216 to make intelligent routing decisions for work items. In some embodiments, the work assignment engine 220 may be configured to administer and make work assignment decisions in a queueless contact center, as is described in U.S. patent application Ser. No. 12/882,950, to Flockhart et al, the entire contents of which are hereby incorporated herein by reference.

More specifically, the work assignment engine 220 can determine which of the plurality of processing resources 212 is qualified and/or eligible to receive the work item and further determine which of the plurality of processing resources 212 is best suited (or is the optimal processing resource) to handle the processing needs of the work item. In situations of work item surplus, the work assignment engine 220 can also make the opposite determination (i.e., determine optimal assignment of a work item resource to a resource). In some embodiments, the work assignment engine 220 can be configured to achieve true one-to-one matching by utilizing bitmaps/tables and other data structures.

In accordance with at least some embodiments of the present disclosure, an agent scripter 228 comprises a web-based user interface that provides the resource 212 with contextual information for consistency in dealing with customers. More specifically, the agent scripter 228 can evaluate a dialog 104 received from the communication network 204 from a customer communication device 208. Information provided by the agent scripter 228 can be used by the work assignment engine 220 to assist resources 212 as questions are received in the form of dialogs 104a-n.

Figure 3:
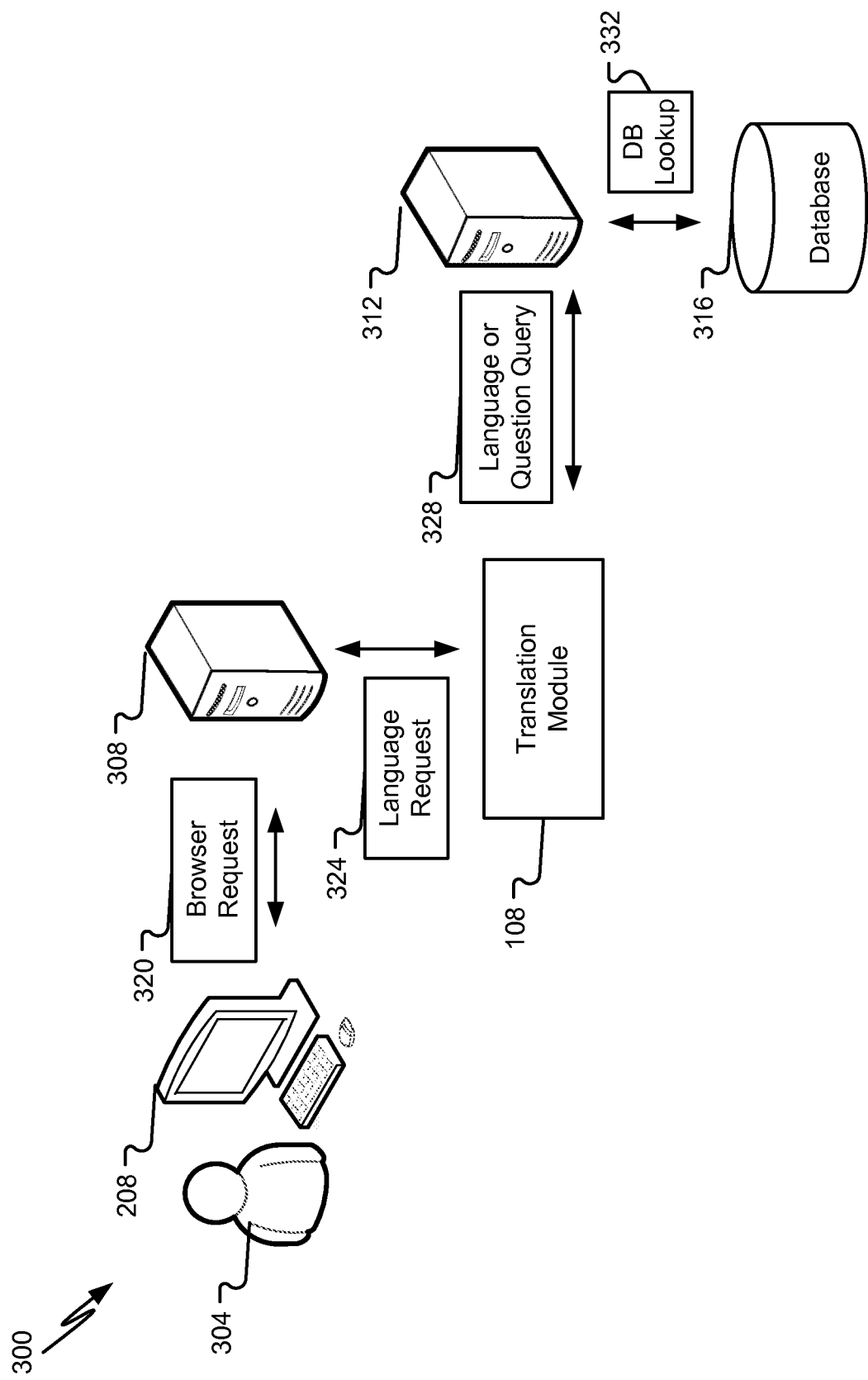
FIG. 3 is an example of a request from a customer to the semantic translation model training system in accordance with embodiments of the present disclosure.

FIG. 3 illustrates an example of a request from a customer to a website requiring the services of the semantic translation model training system. The request process 300 may include, in some embodiments, a customer communication device 208 connected via the Internet to one or more web servers 308, which may be owned and operated by an enterprise administering a contact center in which a translation module 108, a database server 312, and a database 316 operable to set up a session to handle incoming requests and queries from the customer communication device 208.

For example, the customer 304 may have a question for a company. The customer 304 may choose to check a website through a customer communication device 208 connected to a web server 308. The session begins with a browser request 320 from the customer 304. The web server 308 can determine the desired language from the browser request 320. The language request 324 may be sent to a translation module 108 for analysis. If the language request 324 is in a first language, the translation module 108 may query 328 a database 316 for display information requested by the page. If the language request 324 is in a second language, the translation module 108 may initiate a language query 328, potentially causing the semantic translation model training system to create a new language model.

In an example scenario, a customer 304 in Ankara may wish to read through a Frequently Asked Questions (FAQ) page provided by a company. The company may be located in the United States, and as such, the FAQ page would typically be published in English. The customer 304 may initiate a browser request 320 for the FAQ page to be displayed in Turkish. The language request 324 may be forwarded to the translation module 108 if a new language model is needed. If the language model for Turkish has been created previously, the page may be returned to the web server 308 for display at the customer communication device 208 in Turkish.

The translation module 108 may perform a segmentation using the segmentation application 112, a semantic analysis using the semantic analyzer 116, and a syntactic analysis using the syntactic analyzer 120 in conjunction with a data server 312. The translation module 108 can automatically analyze the content and structure of the FAQ question and answer pairs if a language model for Turkish does not yet exist. Based on segmentation, analysis, keywords, grammar, and language rules in the English language model, the semantic translation model training system may create a Turkish language model by initiating a database lookup 332 for keywords, grammar, and language rules and creating a display of the FAQ question and answer pairs in Turkish for the customer 304. If a second customer in Ankara requests the FAQ page in Turkish, the model may provide the translation with a database lookup 332 since the model for Turkish already exists. If a third customer in Lima, Peru, sends a browser request 320 for the FAQ page to be displayed in Spanish, the model may create a model and a translation based on the existing language models and known question and answer pairs in the first language (English) and the second language (Turkish).

Figure 4:
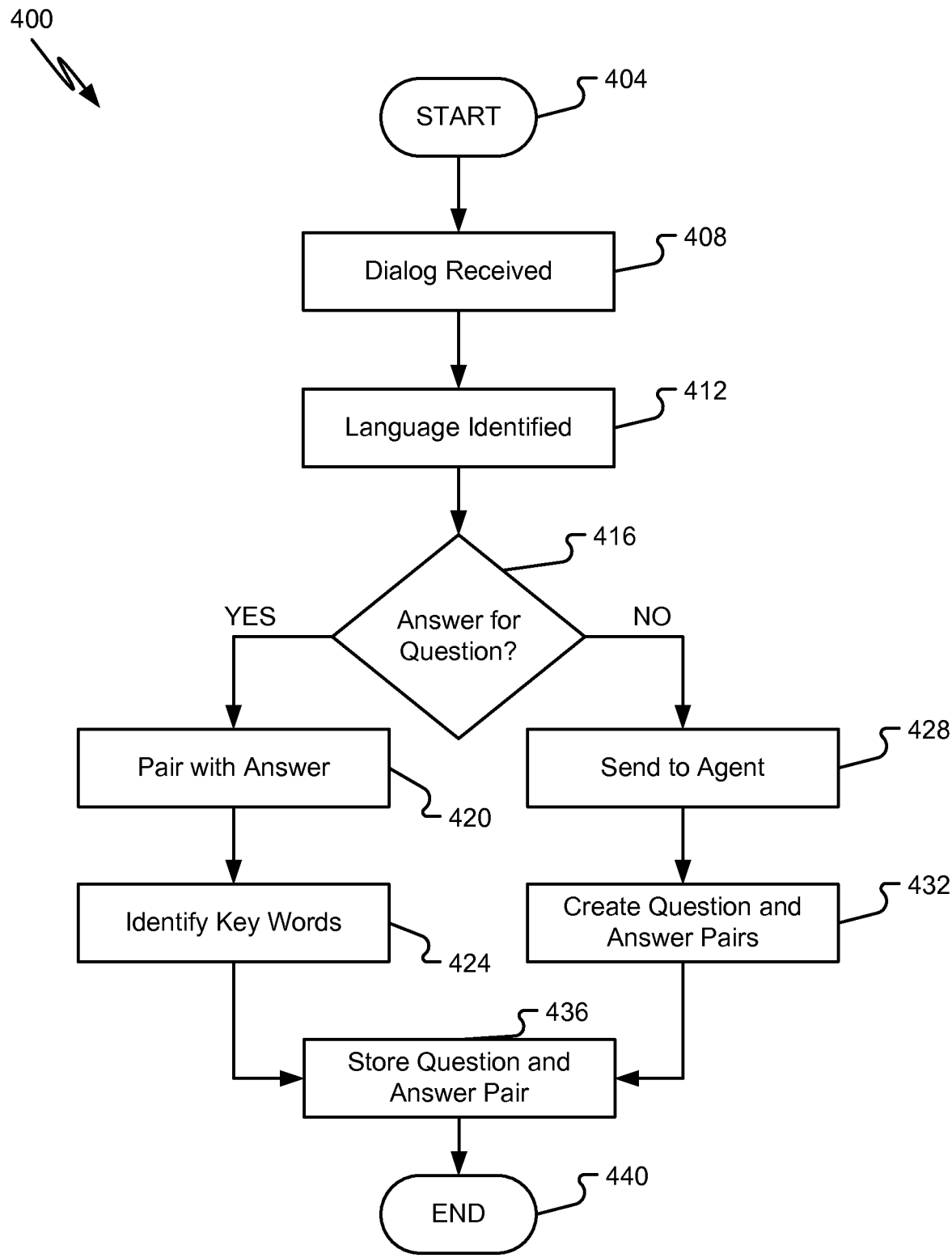
FIG. 4 depicts a flow diagram for creation of question and answer pairs in accordance with embodiments of the present disclosure.

With reference now to FIG. 4, aspects of a method 400 for creating and storing question and answer pairs in accordance with embodiments of the present disclosure are depicted. Generally, the method 400 begins with a start operation 404 and terminates with an end operation 440. While a general order for the steps of the method 400 are shown in FIG. 4, the method 400 can include more or fewer steps or the order of the steps can be arranged differently than those shown in FIG. 4. The method 400 can be executed as a set of computer-executable instructions executed by a computer system and encoded or stored on a computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 400 shall be explained with reference to the systems, components, modules, software, data structures, etc. described in conjunction with FIGS. 1-3.

Typically, the process idles at step 404 until a dialog 104 has been received, in step 408. In step 412, the translation module 108 may determine a language of the dialog 104. Once the language of the dialog 104 has been established, the translation module 108 may determine if an answer to a question presented in the dialog 104 is available in the identified language, in step 416. If the answer to the question presented in the dialog 104 is available in the identified language, then the question may be paired with the answer, in step 420, based on a database lookup 332, query mechanism, or other technique to pair the question and the answer. The question and answer pair may be scanned for the identification of keywords by the translation module 108, in step 424. The question and answer pair may be stored for further use and/or translation in step 436.

If the answer to the question presented in the dialog 104 is not available in the identified language and/or no such answer currently exists in the dialog 104, the question presented in the dialog 104 may be sent to an agent for processing, in step 428. Alternatively, an automatic search and discovery for the answer can be used for step 428. The agent 212 or communication system 200 may find an answer to the question presented in the dialog 104 and pair it with the question presented in the dialog 104, in step 432. The question and answer pair may be stored for further use and/or translation in step 436. The method 400 for creating and storing question and answer pairs ends, at step 440.

Figure 5:
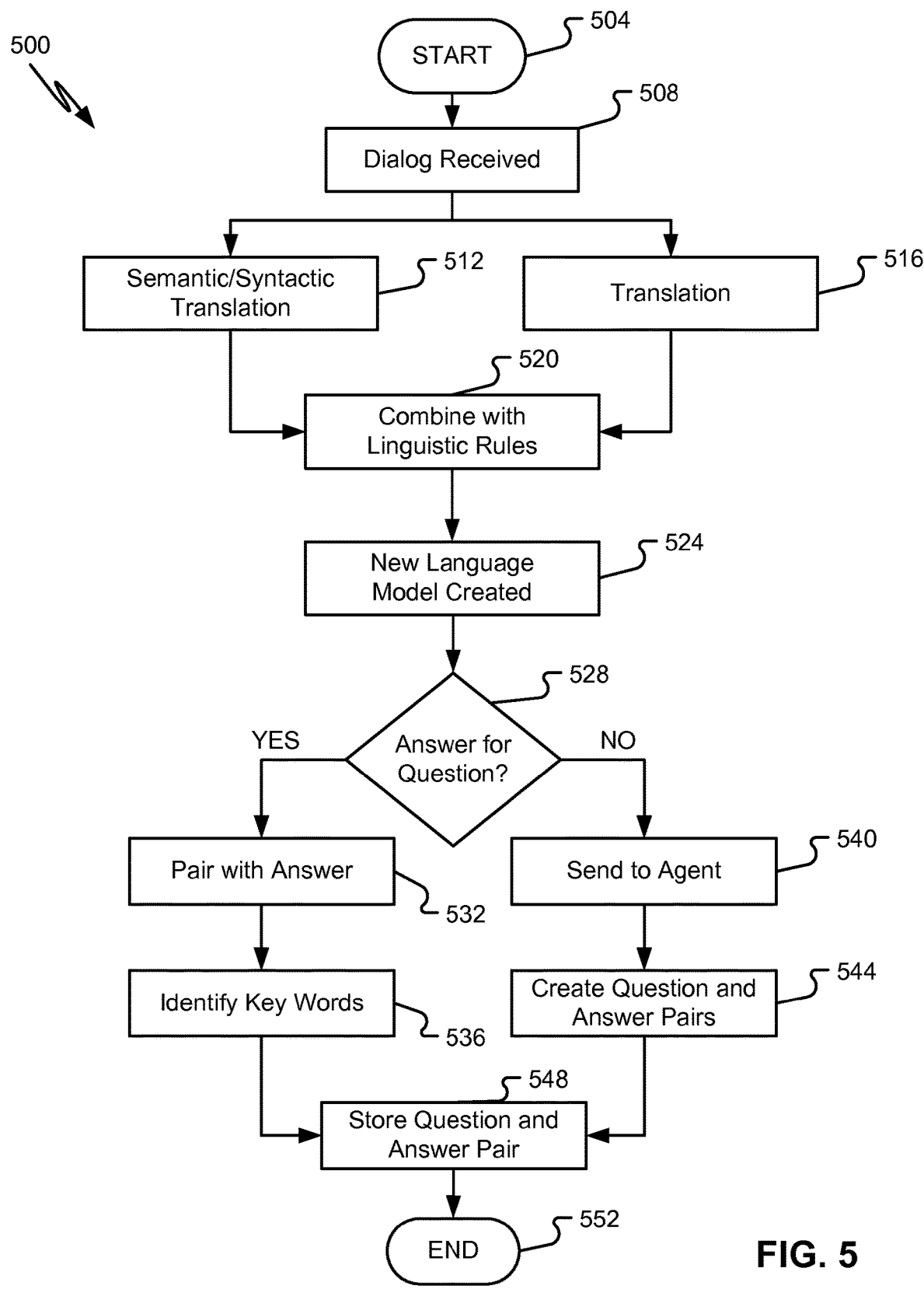
FIG. 5 depicts a flow diagram for creating a new language model in accordance with embodiments of the present disclosure.

The method 500 for creating a language model in accordance with embodiments of the present disclosure is shown in FIG. 5. Generally, the method 500 begins with a start operation 504 and terminates with an end operation 552. While a general order for the steps of the method 500 are shown in FIG. 5, the method 500 can include more or fewer steps or the order of the steps can be arranged differently than those shown in FIG. 5. The method 500 can be executed as a set of computer-executable instructions executed by a computer system and encoded or stored on a computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 500 shall be explained with reference to the systems, components, modules, software, data structures, etc. described in conjunction with FIGS. 1-4.

Typically, the process idles at step 504 until a dialog 104 has been received, in step 508. Dialog segment patterns may be identified and separated for analysis by the segmentation application 112 in the translation module 108, in step 512. The dialog 104a in the form of a first language may be semantically and/or structurally translated in step 512 by the semantic analyzer 116 in the translation module 108. Semantic analysis typically includes the ability to analyze core meaning, including identification of a subject, verb, or object. Segments may also be identified at a topic and/or domain level. Vocabulary, grammar, and other characteristics may be identified through the semantic content analysis. It is at the semantic level where the question may be translated to the target language based on rules and word usage.

Syntactic analysis in step 512 by the syntactic analyzer 120 in the translation module 108 can involve parsing, or breaking down, the dialog segment 104 into its component parts of speech with an explanation of the form, function, and relationship between the components. Syntactic analysis may involve working the words into proper combinations using the results of the semantic analysis. The product of the analyses may be used to automatically generate the training materials, including an intermediate representation of the keyword translations, for the second language. The dialog 104a in the form of a first language may be concurrently translated, in step 516.

The semantic translation model training system may automatically combine the semantic/structural translation and the topic and/or domain words, phrases, constructs, and the first language translation and then apply linguistic rules, in step 520. The representative translation is used to map the dialog 104 from a base language to another language, thereby creating a new language model, in step 524.

In step 528, after the new model has been created, a determination is made as to whether or not an answer exists for the question present in the dialog 104. If the answer to the query is yes, then the question from the dialog 104 may be paired with the answer, in step 532. Within the question and answer pair, keywords may be identified and/or marked, in step 536. If the answer to the query is no, then the question from the dialog 104 may be sent to an agent and/or communication system resource 212, in step 540. Once the agent and/or communication resource 212 finds or creates an answer to the question in the dialog 104, the agent and/or communication resource 212 may create a new question and answer pair, in step 544. The output of steps 536 and 544 may be stored as and displayed as question and answer pairs, in step 548. At step 552, the process ends.

Figure 6:
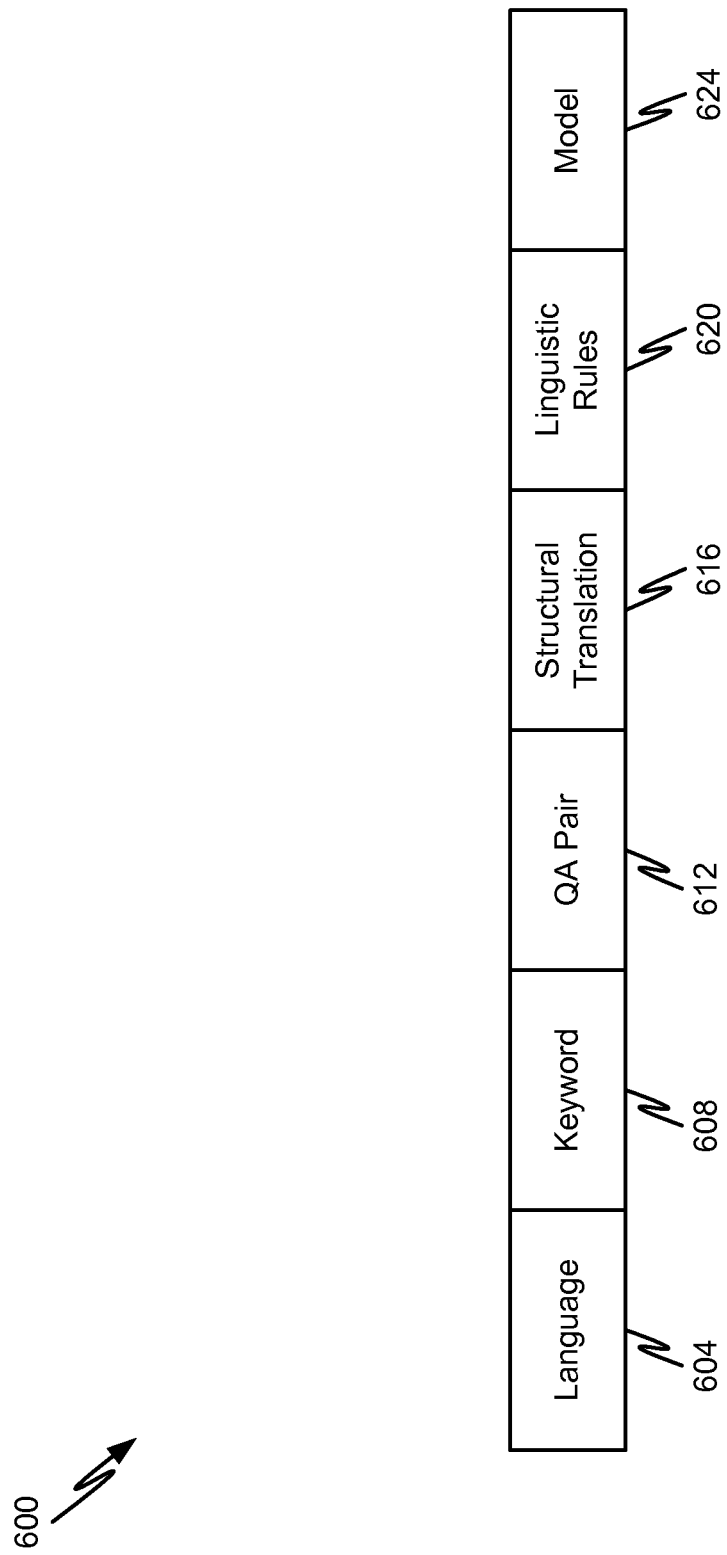
FIG. 6 is a data diagram of data that is used by the semantic translation model training system in accordance with embodiments of the present disclosure.

An embodiment of semantic translation data 600 is shown in FIG. 6. The phrase "semantic translation data," as used herein, refers to a collection of information from question and answer analysis that may be stored by an organization and displayed upon request. Semantic translation data can include, but is not limited to, language information, a keyword, a question and answer pair, information from a structural translation, linguistic rules, and models for target languages.

The semantic translation data 600 may include specific information from interactions with a third party, a direct customer of the contact center, or other users of the semantic translation model through a browser or other system mechanism. The semantic translation data 600 may include metadata. The metadata may include information on the user's language 604. It may also include a keyword 608 that may be associated with a communication that is to be translated. The database information may include the question and answer pair 612 from the dialog 104. The structural translation field 616 can include one or more words translated by the model. The linguistic rules 620 may include grammar or structural guidelines for the target language. The model field 624 may include information including semantic analysis and syntactic analysis data for models that have been created.

If a model is created for a second language using the semantic translation data 600, the stored information may include communication and context information important in a response to a request for an FAQ display and/or a query in a chat session. The response display and/or message may be provided by the contact center and may be automatically sent or sent by a human agent resource 112. Information from the database 316 may also include question and answer information that has been collected in response to multiple interactions with a company or a contact center. While there are only six input fields 604, 608, 612, 616, 620, and 624 as shown in FIG. 6, there may be more or fewer data fields associated with data structure 600.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

What is claimed is:

1. A method for creating semantic translation model training, the method comprising:
   receiving, by a processor, an electronic communication, the electronic communication being in a first language;
   performing, with the processor, a semantic analysis on content of the electronic communication;
   determining, with the processor, from the semantic analysis of the electronic communication, that the content of the electronic communication is a question in the first language;
   performing, with the processor, a syntactic analysis of the content based on the first language;
   determining, with the processor, that an answer in a second language to the electronic communication is available in a database of question and answer pairs, wherein the database is on a network and accessible to one or more user devices;
   translating, with the processor, at least some of the question to the second language by applying linguistic rules of the second language to the question; and
   storing, with the processor, the translated question and the answer as a new question and answer pair in the database of question and answer pairs.

2. The method of claim 1, wherein the syntactic analysis comprises identifying, wherein the question comprises one or more of a question asked, a comment made, and a statement posted in the first language.

3. The method of claim 2, wherein the semantic analysis comprises determining structure associated with how a question is asked in the first language.

4. The method of claim 3, wherein the translating comprises translating the identified at least one of keywords, phrases, questions, and answers in the first language to at least one of keywords, phrases, questions, and answers in the second language and then structuring the translated at least one of keywords, phrases, questions, and answers according to a structure associated with how a question is asked in the second language.

5. The method of claim 4, wherein an answer to the question is identified in the first language, wherein the answer includes one or more of a response, a post, and a comment to the question is translated into the second language to create a question and answer pair in the second language.

6. The method of claim 5, wherein the question and answer pair are used in a contact center to provide at least one of an agent and customer with answers in the second language.

7. The method of claim 5, wherein the question and answer pair are provided in an HTML document and served to a customer via a web server.

8. The method of claim 1, further comprising:
   building a language model in the second language by automatically repeating the translating step for all question and answer pairs in the first language; and
   providing the language model in the second language to at least one of a contact center agent and contact center customer that are speaking the second language but not the first language.

9. A non-transitory computer-readable medium comprising processor-executable instructions, the instruction comprising:
   instructions that receive, by a processor, an electronic communication, the electronic communication being in a first language;
   instructions that perform, by the processor, a semantic analysis on content of the electronic communication;
   instructions that determine, by the processor, from the semantic analysis of the electronic configuration, that the content of the electronic communication is in the first language;
   instructions that perform, by the processor, a syntactic analysis of the content based on the first language;
   instructions that determine, by the processor, that an answer in a second language to the electronic communication is available in a database of question and answer pairs wherein the database is on a network and accessible to one or more user devices;
   instructions that translate, by the processor, at least some of the question to the second language by applying linguistic rules of the second language to the question; and
   instructions that store, by the processor, the translated question and the answer as a new question and answer pair in the database of question and answer pairs.

10. The computer-readable medium of claim 9, wherein the semantic analysis comprises determining structure associated with how a question is asked in the first language.

11. The computer-readable medium of claim 10, wherein an answer to the question is identified in the first language and wherein the answer to the question is translated into the second language to create a question and answer pair in the second language.

12. The computer-readable medium of claim 11, wherein the translating further comprises translating the identified at least one of keywords, phrases, questions, and answers in the first language to at least one of keywords, phrases, questions, and answers in the second language and then structuring the translated at least one of keywords, phrases, questions, and answers according to a structure associated with how a question is asked in the second language.

13. The computer-readable medium of claim 12, wherein the question and answer pair are used in a contact center to provide at least one of an agent and customer with answers in the second language.

14. The computer-readable medium of claim 13, wherein the question and answer pair are provided in an HTML document and served to a customer via a web server.

15. The computer-readable medium of claim 9, wherein the syntactic analysis comprises identifying at least one of keywords, phrases, questions, and answers in the first language.

16. A communication system, comprising:
a memory;
a processor in communication with the memory, wherein the communication system is in communication with a database of question and answer pairs, the processor operable to execute:
a translation module that determines that the system has received an electronic communication, the electronic communication being in a first language and performs the following operations:
receives an electronic communication, the electronic communication being in a first language;
performs a semantic analysis on content of the electronic communication;
determines from the semantic analysis of the electronic communication, that the content of the electronic communication is in the first language in a first language domain;
performs a syntactic analysis of the content based on the first language;
a database interface module that determines that an answer in a second language to the electronic communication is available in the database of question and answer pairs, wherein the database is on a network and accessible to one or more user devices;
wherein the translation module further performs the operation to translate at least some of the question to the second language in a second language domain by applying linguistic rules of the second language to the question; and
wherein the database interface further performs the operation to deliver the translated question and the answer to the database of question and answer pairs.

17. The system of claim 16, wherein the electronic communication comprises at least one of a transcribed voice message, an email, an instant message, and a short message service text.

18. The system of claim 16, wherein the semantic analysis results in the structural determination associated with how a question is asked in the first language.

19. The system of claim 16, wherein the syntactic analysis results in the identification of at least one of keywords, phrases, questions, and answers in the first language.

20. The system of claim 16, wherein the translation comprises a combination of the semantic analysis results, the syntactic analysis results, and application of the linguistic rules.

* * * * *